(12) United States Patent
Kuhn et al.

(10) Patent No.: US 7,654,033 B2
(45) Date of Patent: Feb. 2, 2010

(54) SYSTEM FOR MANAGEMENT OF FISHING TACKLE AND TOOLS

(76) Inventors: Todd Kuhn, 171 Springfield Dr., S., North East, MD (US) 21901; Robert Mark Peiser, Jr., 5828 Mustang Ct., Indianapolis, IN (US) 46228

( * ) Notice: Subject to any disclaimer, the term of this patent is extended or adjusted under 35 U.S.C. 154(b) by 5 days.

(21) Appl. No.: 11/602,434

(22) Filed: Nov. 9, 2006

(65) Prior Publication Data

US 2008/0110078 A1 May 15, 2008

(51) Int. Cl.
*A01K 97/06* (2006.01)

(52) U.S. Cl. .......................................... 43/57.1; 43/54.1

(58) Field of Classification Search ................ 43/57.1, 43/54.1; 206/315.11; D22/136
See application file for complete search history.

(56) References Cited

U.S. PATENT DOCUMENTS

| | | | | |
|---|---|---|---|---|
| 2,710,484 A | * | 6/1955 | McGinnis | 43/57.1 |
| 2,908,012 A | * | 10/1959 | Feldman | 43/57.1 |
| 2,974,804 A | * | 3/1961 | Maro | 211/70.6 |
| 3,512,295 A | * | 5/1970 | Barge | 43/57.1 |
| 4,238,901 A | | 12/1980 | Martinet et al. | |
| 4,535,897 A | * | 8/1985 | Remington et al. | 211/70.6 |
| 4,604,822 A | * | 8/1986 | Christenberry | 43/57.1 |
| 4,742,640 A | * | 5/1988 | Moore | 43/57.1 |
| 4,881,674 A | * | 11/1989 | Medianik | 224/311 |
| 6,256,925 B1 | * | 7/2001 | Blackburn | 43/57.1 |
| 6,782,654 B1 | * | 8/2004 | Borchardt | 43/54.1 |
| 6,860,059 B1 | * | 3/2005 | Hoover | 43/54.1 |
| 7,401,435 B1 | * | 7/2008 | Ryan | 43/57.1 |
| 2006/0191188 A1 | | 8/2006 | Peiser | |

* cited by examiner

*Primary Examiner*—Kurt Rowan

(57) ABSTRACT

The invention is a storage system for fishing lures and fishing tools that can be mounted to a vehicle such as a boat, prevents the lures and tools from becoming entangled or unintentionally dislodged, and yet provides easy and immediate accessibility for the user. A key feature of the present invention is the means for securing the fishing lures. Individual lures are isolated from each other and from dislodgement during the rough motion of a fishing boat at speed. Special tortuous slots retain the tackle hooks until deliberate removal by an angler for use. Another key feature of the present invention is the means for securing commonly used fishing tools, such as pliers, wire cutters, or hook disgorgers, against dislodgement. The tools are held in place by rubber grommets. This means resists tool dislodgement during the rough motion of a fishing boat at speed, yet it also provides easy access to the angler.

10 Claims, 4 Drawing Sheets

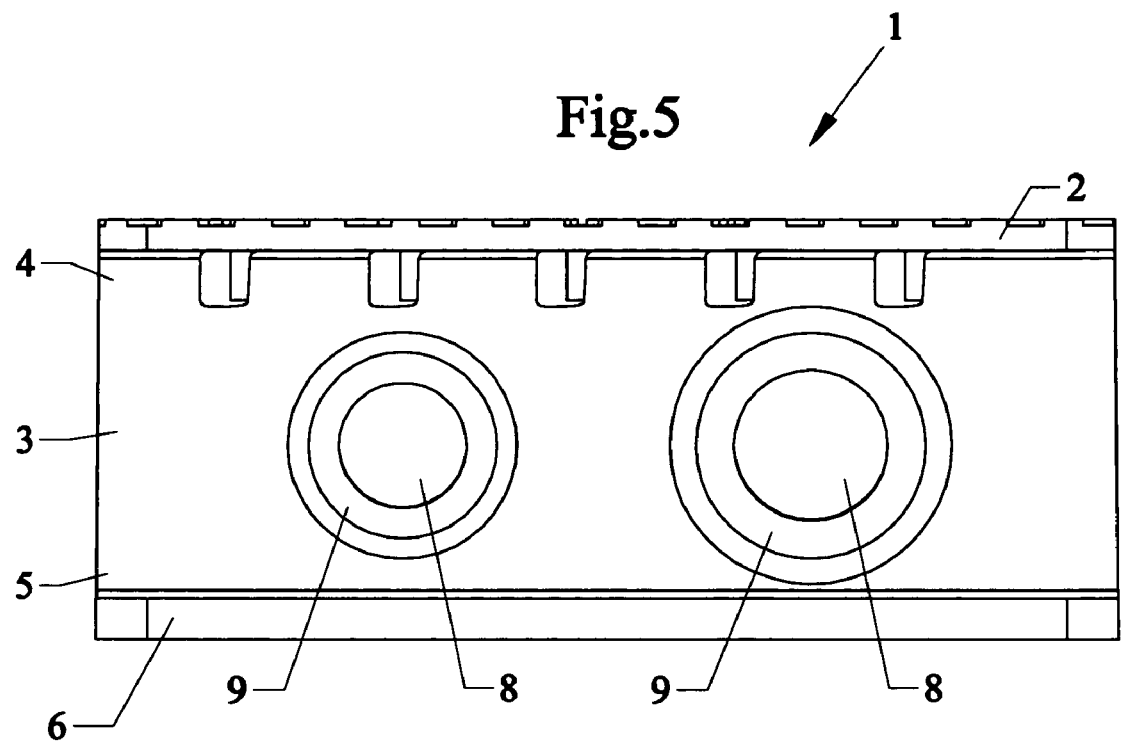
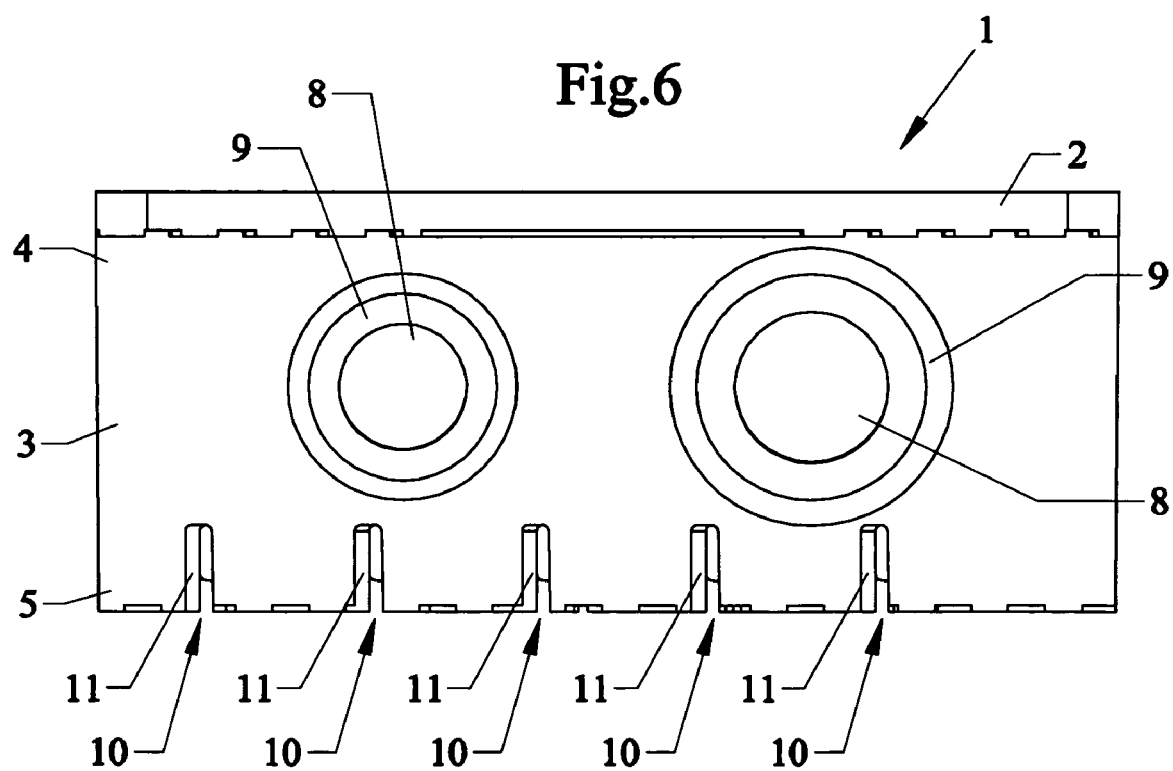

SYSTEM FOR MANAGEMENT OF FISHING TACKLE AND TOOLS

BACKGROUND OF THE INVENTION

1. Field of the Invention

The present invention relates generally to the field of systems used to store fishing supplies. Specifically, the invention relates to systems used to manage fishing lures and commonly used fishing tools. Such a system prevents the lures and tools from becoming entangled yet provides easy and immediate accessibility for the user.

2. Description of the Prior Art

Contemporary fishing requires a considerable amount of equipment. The typical fisherman today brings with him a variety of lures and assorted tools. Tournament fishermen often need immediate and frequent access to a group of favorite lures and tools.

Historically such lures and tools have been stored in a traditional tackle box. Such a storage method has the disadvantage that the tackle box must be unstowed and restowed each time the tournament fisherman moves from one spot to another during a competitive event. The acts of unstowing and restowing take valuable time.

One prior art solution is a system or rack used to store a limited number of fishing lures by hanging them from their associated fish hooks. In these prior art designs, lures simply hung vertically by their hooks which were inserted through holes or apertures. A fishing boat at high speed experiences considerable transient vertical and translational movement. A lure hanging from its hook inserted through a simple hole or aperture is likely to be ejected from the same hole or aperture as the boat bounces up and down. The prior art of Peiser, Jr. (U.S. patent application Ser. 11/065,610 now abandoned) discloses such an invention. The prior art of Martinet, et al., (U.S. Pat. No. 4,238,901) attempts to mitigate this deficiency by the inclusion of a cover to restrain the vertical ejection of the hook from an aperture. However, the cover must be deliberately closed in order to function. If a fisherman inadvertently fails to close the cover, the hook and its associated lure may become dislodged. The prior art fails to teach a fishing lure presentation system that does not require a secondary means to assure the lures remain engaged in the system during the rough conditions found on a boat at high speed.

Fishing tools were also historically relegated to a simple tackle box. A tournament fisherman wastes valuable time digging through such a tackle box in search of tools such as pliers or a hook disgorger. Tools left on the boat deck can end up overboard during the rough movement of a fishing boat as it moves at high speed from one location to another. Maro (U.S. Pat. No. 2,974,804) teaches a tool holder with a plurality of holes or slots wherein tools can be placed for easy organization and access. The tool holder of Maro is designed to be attached to a vertical surface. However, prior art such as that of Maro does not perform well in a fishing boat environment. The tools are not restrained in their holes or slots. Such unstrained tools are likely to be ejected from the prior art tool holder by the rough vertical and translational movement of a boat at high speed. The prior art of Peiser, Jr., seeks to improve upon the prior art by adding a rubber grommet to each hole. Peiser, Jr., is silent about the relative size of the tools to the openings provided by the rubber grommets. A rubber grommet with an aperture of larger diameter than the maximum tool diameter does not actively grip or restrain the tool or prevent ejection of the tool during boat operation.

SUMMARY OF THE INVENTION

The present invention is a storage system for fishing lures and fishing tools that can be mounted to a substantially vertical surface, preferably of a vehicle such as a boat, prevents the lures and tools from becoming entangled or dislodged, and yet provides easy and immediate accessibility for the user. A key feature of the present invention is the means for securing the fishing lures. Individual lures are isolated from each other and from dislodgement during the rough motion of a fishing boat at speed. Special tortuous slots retain the tackle hooks until deliberate removal by an angler for use. Another key feature of the present invention is the means for securing commonly used fishing tools, such as pliers, wire cutters, or hook disgorgers, against dislodgment. The tools are held in place by friction fit within rubber grommets. This means resists tool dislodgement during the rough motion of a fishing boat at speed, yet it also provides easy access to the angler.

BRIEF DESCRIPTION OF THE DRAWINGS

FIG. 5 shows a bottom view of the storage system of the present invention.

FIG. 6 shows a top view of the storage system of the present invention.

DETAILED DESCRIPTION OF THE INVENTION

Figure 1:
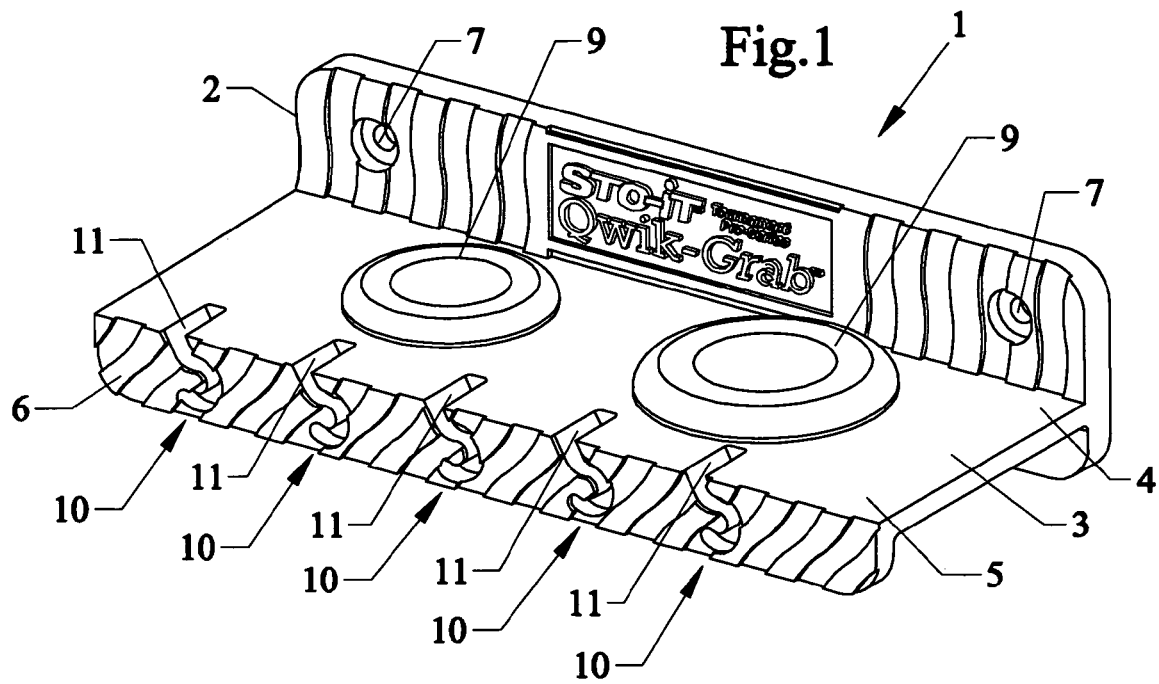
FIG. 1 shows an oblique perspective of the storage system of the present invention.
Figure 2:
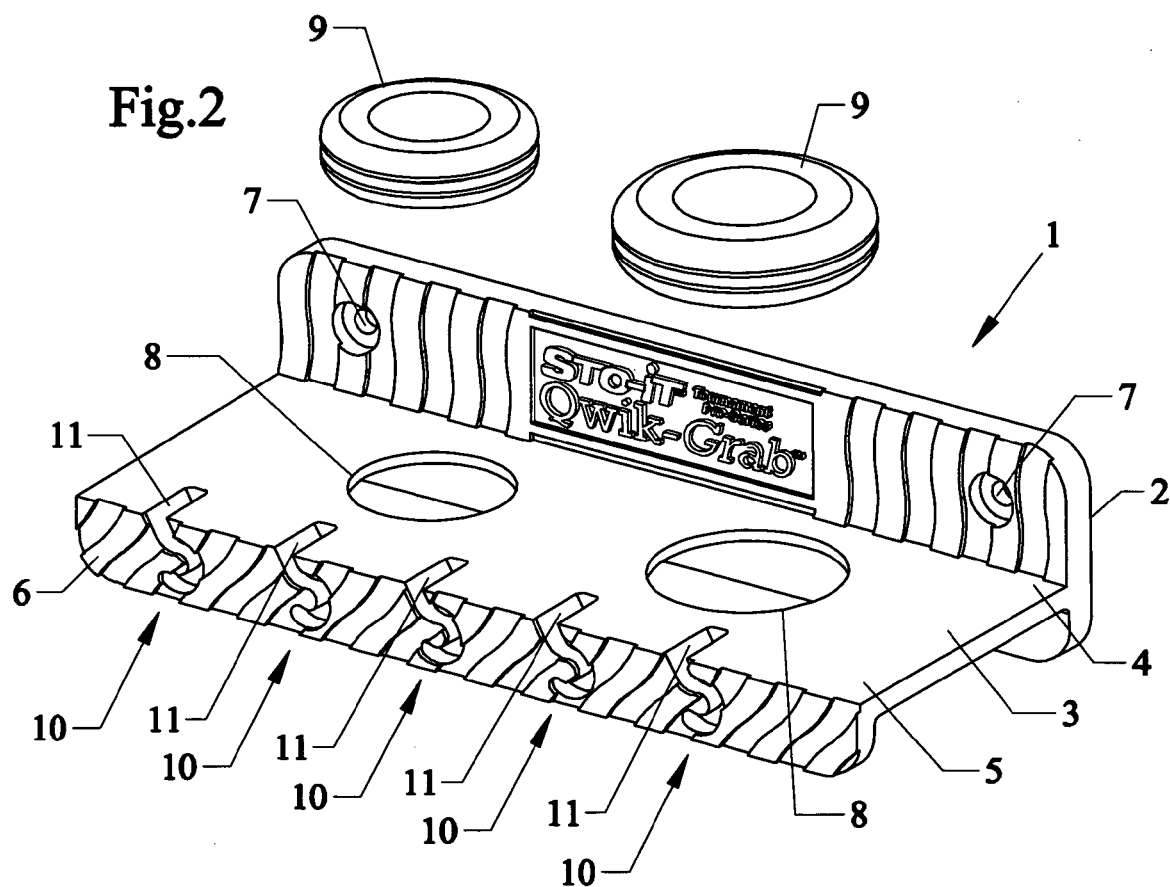
FIG. 2 shows an oblique perspective of the storage system of the present invention with rubber grommets removed.
Figure 3:
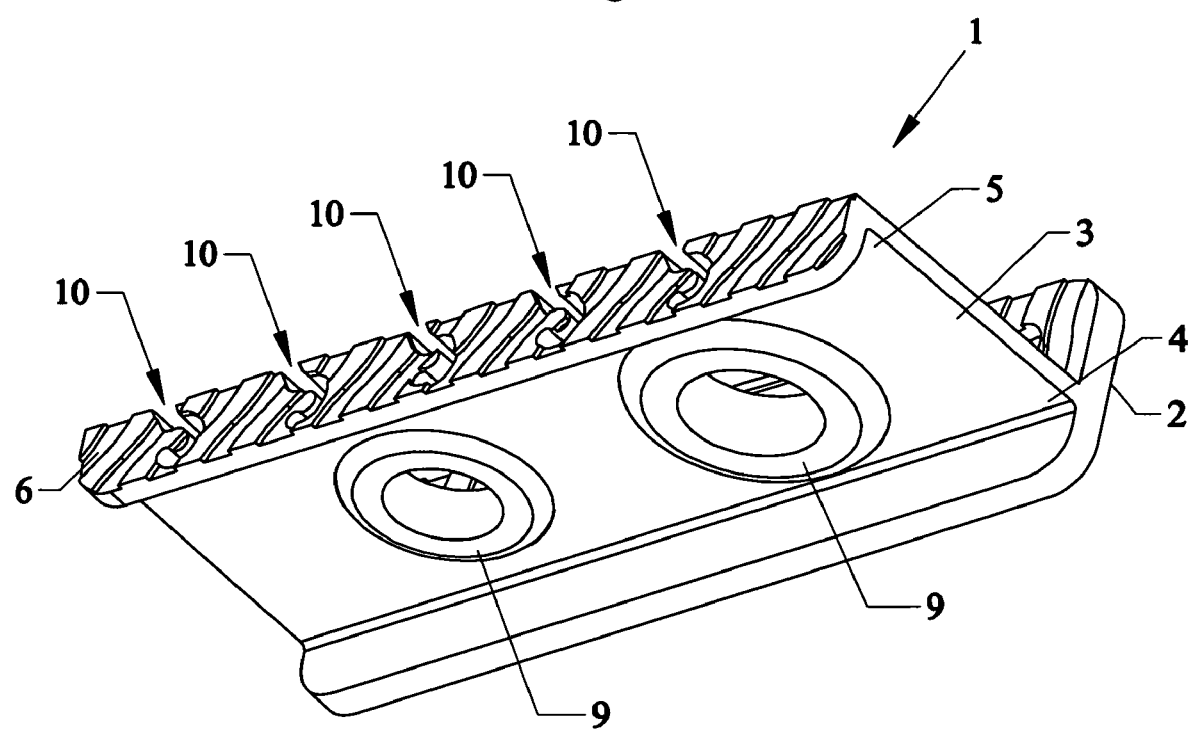
FIG. 3 shows a bottom oblique perspective of the storage system of the present invention.

With reference to FIGS. 1 through 6, the storage system 1 of this invention comprises a substantially horizontal plate 3 with a rear edge 4 and a front edge 5, a substantially vertical back plate 2, and a substantially vertical front plate 6. Horizontal plate 3 is permanently joined to back plate 2 along the length of rear edge 4. Horizontal plate 3 is permanently joined to front plate 6 along the length of front edge 5. Horizontal plate 3, back plate 2, and front plate 6 may be manufactured from aluminum, stainless steel, wood, plastic, or other structural materials by any means known in the art. They may be manufactured from dissimilar materials and joined by bonding means such as welding or adhesive bonding. Alternatively, all three plates of system 1 may be manufactured as a monolithic structure from a single billet of raw material. In the preferred embodiment, horizontal plate 3, back plate 2, and front plate 6 are manufactured simultaneously and contiguously from plastic, which provides for ease of manufacture and superior resistance to damage from harsh environmental conditions commonly found on fishing boats.

Back plate 2 further includes fastening means 7 for securing system 1 to a vertical surface of a fishing boat, such as the transom. In the preferred embodiment shown in FIGS. 1-6, fastening means 7 comprises a pair of through holes (shown) and a pair of screws (not shown). However, one of ordinary skill in the art would recognize that other equivalent means may be used to permanently or temporarily mount back plate 2 to a preferred surface of a boat. Such means include, but are not limited to, adhesive bonding, clips, snaps, or hook and loop tape such as VELCRO®.

Figure 4:
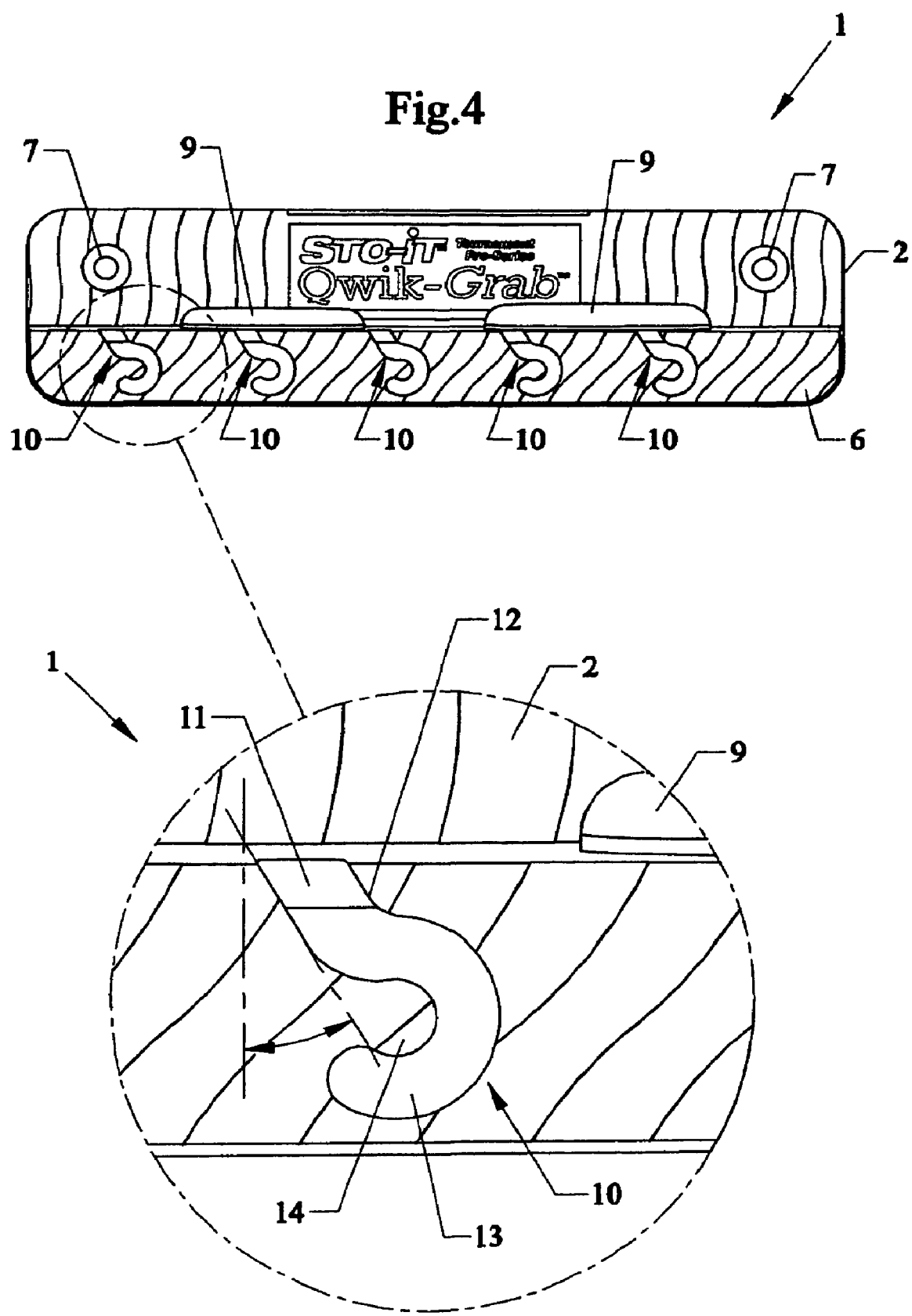
FIG. 4 shows a detailed view of the tackle retention means of the storage system of the present invention.

Within system 1, horizontal plate 3 further includes at least one lure retention slot 10 located along front edge 5. In the preferred embodiment, a plurality of lure retention slots 10 are distributed along the length of front edge 5. Lure retention slots 10 are a key feature of the present invention. Each slot 10 comprises a slot opening 11, a sloped first slot portion 12, a tortuous second slot portion 13, and one or more protruding lobes 14 that help define second slot portion 13. In the preferred embodiment shown in the figures, slot 10 begins with slot opening 11 cut through front edge 5 of horizontal plate 3. From opening 11, sloped first slot portion 12 of slot 10 continues down the substantially vertical face of front plate 6 at an angle of between about 15 degrees and about 75 degrees relative to the vertical direction. From the lower terminus of first slot portion 12, tortuous second slot portion 13 of slot 10 continues down the substantially vertical face of front plate 6. Second slot portion 13 may form a simple C-shaped arc as shown in FIG. 4 or a more complicated zig-zag or tortuous path. The left to right jogs in second slot portion 13 are defined by one or more protruding lobes 14 that bend the overall geometry of second slot portion to the left or right of the vertical direction.

The purpose of each lure retention slot 10 is to capture and securely maintain the hooks connected to fishing lures. Once a hook is inserted into lure retention slot 10 of the present invention, the depending lure can not be easily dislodged from slot 10 during the random vertical and translational movement of the associated fishing boat at speed. A fisherman can only deliberately remove a desired fishing lure from slot 10 by grasping the shank of the lure's hook and carefully reversing the hook up and out of slot 10.

Within system 1, horizontal plate 3 further includes at least one through-hole 8 wherein a tool associated with fishing can be stored. Each through-hole 8 is fitted with a flexible grommet 9, which is a key feature of the present invention. Hole 8 and concentric grommet 9 are sized such that the innermost diameter of grommet 9 is slightly smaller than the maximum outermost diameter of a fishing tool to be stored. Because of the relative geometries, a representative fishing tool (not shown) must be forced through grommet 9, thereby slightly compressing the inner surfaces of grommet 9. Used in this manner, grommet 9 functions as more than a simple 'bumper' or other protective means for system 1. Fishing tools are firmly held by friction fit and can not be easily dislodged during the rough, random vertical and translational movement experienced by a fishing boat at high speed. Tools may only be removed by the deliberate, intended actions of a fisherman. In the preferred embodiment, a plurality of through-holes 8 and associated grommets 9 are distributed along the length of horizontal plate 3. Grommet 9 may be manufactured from any flexible and compressible material such as, but not restricted to, latex, silicone, nitrile, or buna. In the preferred embodiment, a plurality of through-holes 8 and associated grommets 9 are included in a variety of diameters to accommodate a variety of tools. In one marketing embodiment, specific tools may be provided along with system 1 in order to ensure optimal compatibility and friction fit within associated grommets 9.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A storage system for fishing lures and tools associated with fishing comprising:
   a substantially horizontal plate with a rear edge and a front edge;
   a back plate; and
   a front plate;
   wherein said horizontal plate is permanently joined to said back plate along the length of said rear edge;
   wherein said horizontal plate is permanently joined to said front plate along the length of said front edge;
   wherein said horizontal plate further includes at least one lure retention slot located along said front edge; and
   wherein each said retention slot further comprises a slot opening, a sloped first slot portion, and a tortuous second slot portion;
   wherein said slot opening is cut through said front edge of said horizontal plate;
   wherein said sloped first slot portion continues from said slot opening down the face of said front plate at an angle relative to the vertical direction;
   wherein said tortuous second slot portion continues from the lower terminus of said first slot portion down the face of said front plate; and
   wherein said tortuous second slot portion comprises one of a C-shaped arc or a zigzag.

2. The storage system according to claim 1,
   wherein said second slot portion is defined by at least one protruding lobe that bend the overall geometry of second slot portion to the left or right of the vertical direction.

3. The storage system according to claim 1,
   wherein said sloped first slot portion continues down the face of said front plate at an angle of between about 15 degrees and about 75 degrees relative to the vertical direction.

4. The storage system according to claim 1,
   wherein said front plate is substantially vertical; and
   wherein said back plate is substantially vertical.

5. The storage system according to claim 1,
   wherein said horizontal plate further includes at least one through-hole for supporting tools associated with fishing;
   wherein each said through-hole is fitted with a flexible grommet means to receive and retain a tool associated with fishing; and
   wherein each said through-hole and said grommet are sized such that the innermost diameter of said grommet is slightly smaller than the maximum outermost diameter of said fishing tool to be stored.

6. The storage system according to claim 5,
   further comprising a plurality of said through-holes and said associated grommets are distributed along the length of said horizontal plate.

7. The storage system according to claim 1,
   further comprising a fastening means for securing said system to a vertical surface of a fishing boat.

8. The storage system according to claim 5,
   further comprising a fastening means for securing said system to a vertical surface of a fishing boat.

9. A storage system for fishing lures and tools associated with fishing comprising:
   a substantially horizontal plate with a rear edge and a front edge;
   a substantially vertical back plate;
   a substantially vertical front plate; and
   a fastening means for securing said system to a vertical surface of a fishing boat;

wherein said horizontal plate is permanently joined to said back plate along the length of said rear edge;
wherein said horizontal plate is permanently joined to said front plate along the length of said front edge;
wherein said horizontal plate further includes a plurality of lure retention slots distributed along the length of said front edge;
wherein each said retention slot further comprises a slot opening, a sloped first slot portion, and a tortuous second slot portion;
wherein said slot opening is cut through said front edge of said horizontal plate;
wherein said sloped first slot portion continues from said slot opening down the face of said front plate at an angle relative to the vertical direction;
wherein said tortuous second slot portion continues from the lower terminus of said first slot portion down the face of said front plate;
wherein said tortuous second slot portion comprises one of a C-shaped arc or a zigzag;
wherein said horizontal plate further includes a plurality of through-holes distributed along the length of said horizontal plate for supporting tools associated with fishing;
wherein each said through-hole is fitted with a flexible grommet means to receive and retain a tool associated with fishing; and
wherein each said through-hole and said grommet are sized such that the innermost diameter of said grommet is slightly smaller than the maximum outermost diameter of said fishing tool to be stored.

10. In combination with a plurality of fishing lures and a plurality of tools associated with the fishing arts, a storage system comprising:
a substantially horizontal plate with a rear edge and a front edge;
a substantially vertical back plate;
a substantially vertical front plate; and
a fastening means for securing said system to a vertical surface of a fishing boat;
wherein said horizontal plate is permanently joined to said back plate along the length of said rear edge;
wherein said horizontal plate is permanently joined to said front plate along the length of said front edge;
wherein said horizontal plate further includes a plurality of lure retention slots distributed along the length of said front edge;
wherein each said retention slot further comprises a slot opening, a sloped first slot portion, and a tortuous second slot portion;
wherein said slot opening is cut through said front edge of said horizontal plate;
wherein said sloped first slot portion continues from said slot opening down the face of said front plate at an angle relative to the vertical direction;
wherein said tortuous second slot portion continues from the lower terminus of said first slot portion down the face of said front plate;
wherein said tortuous second slot portion comprises one of a C-shaped arc or a zig-zag;
wherein said horizontal plate further includes a plurality of throughholes distributed along the length of said horizontal plate for supporting tools associated with fishing;
wherein each said through-hole is fitted with a flexible grommet means to receive and retain a tool associated with fishing;
wherein each said through-hole and said grommet are sized such that the innermost diameter of said grommet is slightly smaller than the maximum outermost diameter of said fishing tool to be stored.

* * * * *